United States Patent [19]
Haines

[11] Patent Number: 5,307,288
[45] Date of Patent: Apr. 26, 1994

[54] UNITARY FLUID FLOW PRODUCTION AND CONTROL SYSTEM

[76] Inventor: Lawrence A. Haines, 1000 S. 1000 East, Mapleton, Utah 84664

[21] Appl. No.: 712,205

[22] Filed: Jun. 7, 1991

[51] Int. Cl.$^5$ .............................................. G01F 1/10
[52] U.S. Cl. ...................................... 364/510; 60/443; 415/144
[58] Field of Search .................. 364/510; 60/443, 452, 60/450, 449, 451; 417/222; 91/506, 206; 415/144

[56] References Cited

U.S. PATENT DOCUMENTS

| | | | |
|---|---|---|---|
| 3,665,945 | 5/1972 | Ottenstein | 364/510 |
| 4,277,832 | 7/1981 | Wong | 364/510 |
| 4,694,390 | 9/1987 | Lee | 364/510 |
| 4,725,964 | 1/1988 | Lloyd et al. | 364/510 |
| 4,804,313 | 2/1989 | Nasvytis | 415/144 |
| 4,816,987 | 3/1989 | Brooks et al. | 364/510 |
| 4,823,552 | 4/1989 | Ezell et al. | 60/443 |
| 4,951,224 | 8/1990 | Hokynar | 364/510 |

*Primary Examiner*—Kevin J. Teska
*Assistant Examiner*—Thomas Peeso
*Attorney, Agent, or Firm*—Thorpe North & Western

[57] ABSTRACT

A fluid flow production and control system includes a variable speed pump defining a fluid flow path therethrough and a fluid flow path outlet, for operating at a speed determined by an input speed control signal. Also included is a pressure sensor for detecting the pressure of fluid at the outlet, and a flow rate sensor for detecting the flow rate of fluid at the outlet. One or more dimensional parameters of the flow path, such as the cross-sectional area, venting ports along the direction of the flow path, and the like, may be varied in response to a parameter control signal. A control unit coupled to the pressure sensor and flow rate sensor and responsive to detected pressures and flow rates supplies an input speed control signal to the pump and a parameter control signal to the dimensional parameter varying mechanism to thereby produce a selected flow rate and fluid pressure at the outlet.

19 Claims, 3 Drawing Sheets

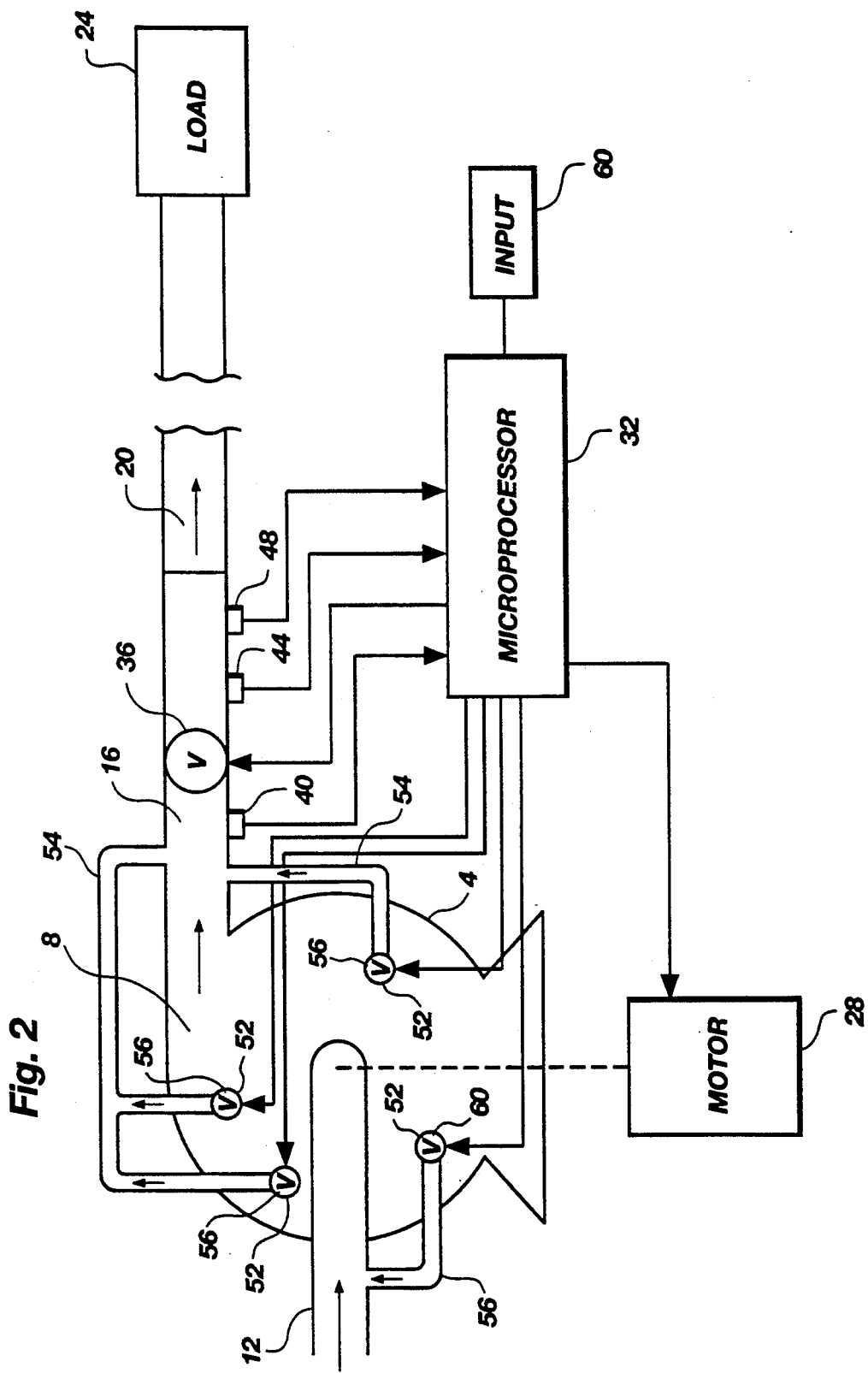

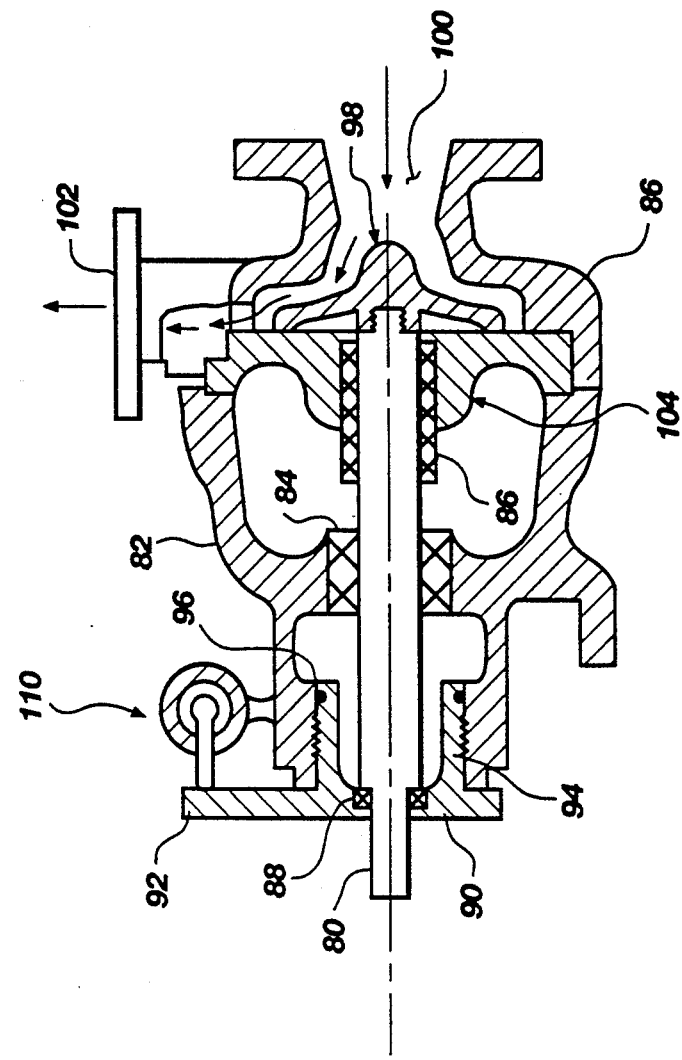
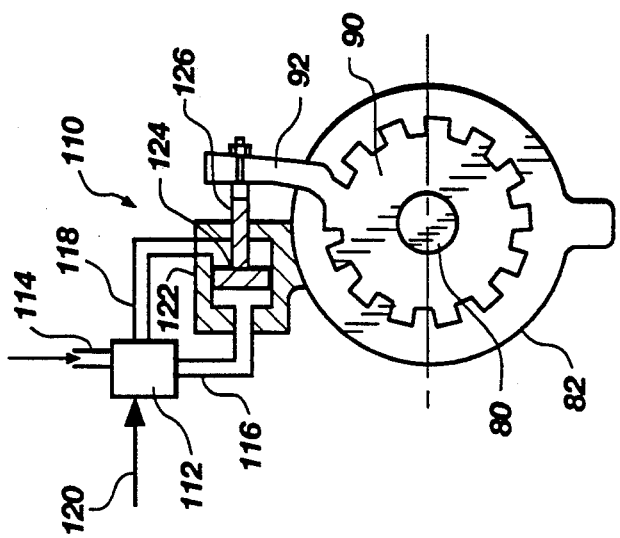

UNITARY FLUID FLOW PRODUCTION AND CONTROL SYSTEM

BACKGROUND OF THE INVENTION

The present invention relates to a unitary fluid flow production and control system in which output pressure of the fluid and flow rate of the fluid can be independently controlled.

Fluid flow development is utilized in a wide variety of systems and for a variety of purposes including, for example, fuel delivery for automobiles, aircraft and other motorized vehicles, water delivery systems, hydraulic systems, pneumatic systems, chemical and petrochemical processes, oil refining, power generation, heating and air conditioning systems, etc. The fluid flow in such systems may be produced using various type pumps such as centrifugal pumps, piston actuated pumps, diaphragm pumps, and the like.

In nearly all fluid flow production systems, two of the parameters or fluid characteristics of interest are flow rate at the output of the pump or other flow developing device, and output pressure of the fluid. It is oftentimes desirable to control, to the extent possible, these two parameters but effectuation of such control such as by varying the speed of operation of the pump, for example, results in controlling either the output flow rate or the output pressure, but not both. In particular, plotting output pressure versus output flow rate for different pump speeds yields a family of curves in which the output pressure decreases as the flow rate increases and vice versa. Furthermore, throttling the discharge of a constant speed pump affects both flow and pressure, but not independently. Of course, independent control and selected variation of each parameter by itself would be desirable.

Exemplary prior art patents describing fluid flow systems, pumps and approaches to controlling operation of the systems include U.S. Pat. Nos. 4,932,840 (control apparatus of variable delivery pumps), 4,801,247 (control of various parameters of a variable displacement piston pump), 3,563,672 (a pump control system for maintaining a substantially constant output pressure), 2,944,488 (a pump control system to maintain a constant pressure in a fluid delivery line downstream of a pump), 4,204,808 (a variable drive pump to maintain a pipe line suction pressure at an acceptable level), 4,257,746 (dosimeter having a low air flow rate), 4,795,314 (condition responsive pump such as a peristaltic blood pump control utilizing integrated, commanded, and sensed flow rate signals), 4,332,527 (variable speed centrifugal pump), and 4,907,950 (variable positive fluid displacement system).

SUMMARY OF THE INVENTION

It is an object of the invention to provide a fluid flow production and control system in which output fluid pressure and fluid flow rate may be independently controlled.

It is also an object of the invention to provide such a system in which the control is effectuated in a simple, efficient and low cost manner.

It is a further object of the invention to provide such a system which may be utilized with a variety of fluid flow developing devices.

It is an additional object of the invention to provide such a system which may be installed as a fully integrated and complete assembly to develop fluid flow with full control of the flow and the pressure.

The above and other objects of the invention are realized in a specific illustrative embodiment of a fluid flow control system which includes a variable speed pump defining a fluid flow path therethrough and a fluid flow path outlet, for operating at a speed determined by an input control signal to pump fluid along the fluid flow path at a rate which increases with the increase in speed of the pump and vice versa, and at a pressure which increases with the increase in the speed of the pump and vice versa. Installed at the fluid flow path outlet is a valve and two pressure sensors, one disposed upstream of the valve and one downstream. The resultant two pressure signals are taken to a microprocessor control unit which adjusts signals to the valve and to the variable speed motor to thereby control the opening of the valve and the speed of the pump and thus control both fluid flow rate and output pressure. The combination of the valve and two pressure sensors is described more fully in co-pending patent application, Ser. No. 07/533,166, filed Jun. 1, 1990.

BRIEF DESCRIPTION OF THE DRAWINGS

The above and other objects, features and drawings of the invention will become apparent from a consideration of the following detailed description presented in connection with the accompanying drawings in which:

FIG. 2 is a schematic representation of another embodiment of a system made in accordance with the present invention; and FIGS. 3A and 3B are front and side cross-sectional views respectively of still another embodiment of a pump for producing fluid flow, in which the internal configuration may be changed to control the flow in accordance with the present invention.

DETAILED DESCRIPTION

Figure 1:
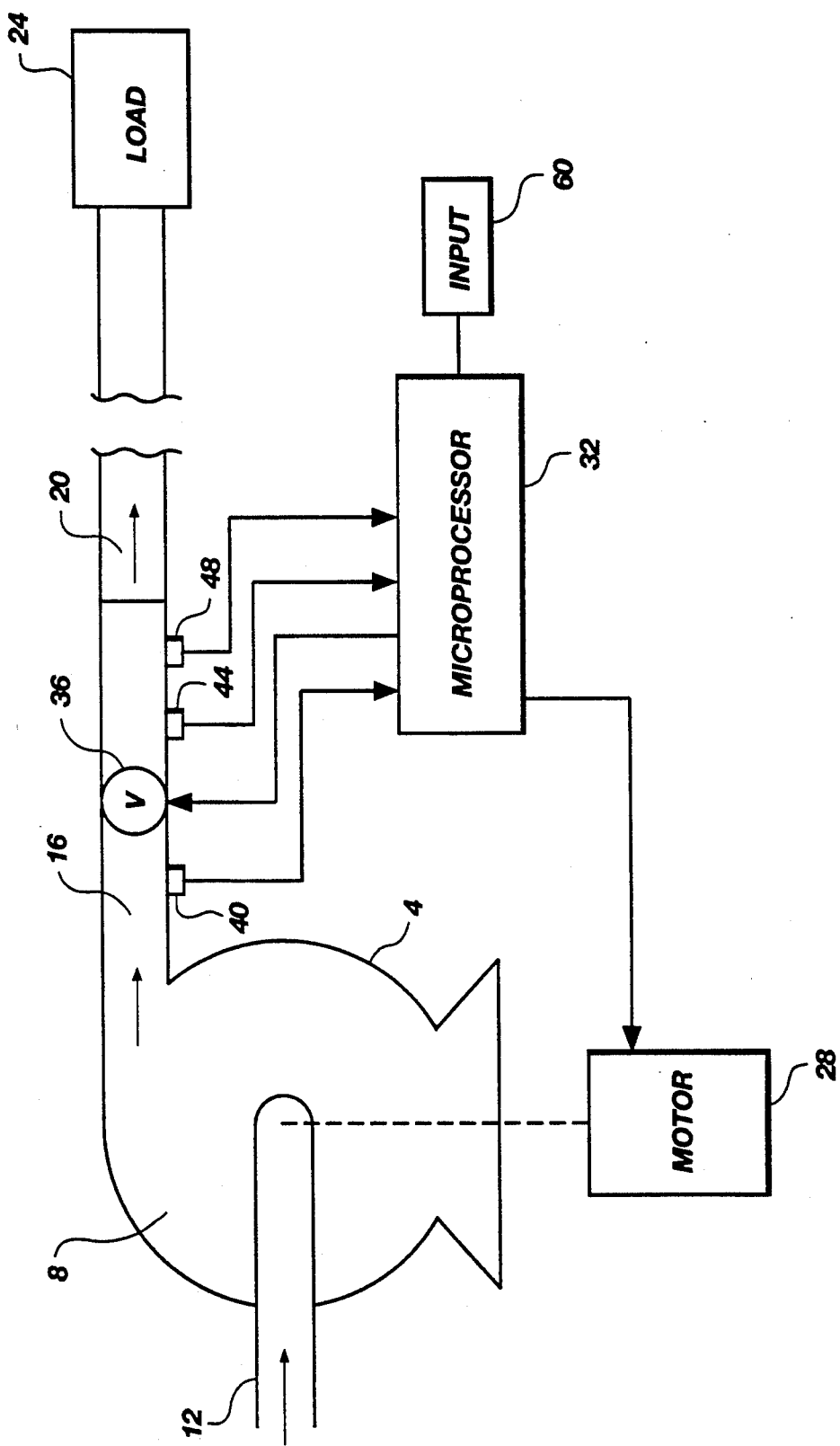
FIG. 1 is a schematic representation of one embodiment of a unitary fluid flow production and control system made in accordance with the principles of the present invention.

There is shown in FIG. 1 one illustrative embodiment of a fluid flow production and control system including a centrifugal pump 4 having a housing with sidewalls 8 within which fluid flow is developed, an input section 12 through which fluid to be pumped enters the housing 8, and an output section 16 for carrying fluid from the housing. The output section 16 is coupled to a conduit 20 which carries the fluid from the pump 4 to a load or utilization destination 24.

The pump 4 is powered by a variable speed motor 28 which could illustratively be an electric motor, an hydraulic motor, a turbine, etc. The speed of the motor 28 is controlled by a control unit such as a microprocessor 32 which could be any variety of available microprocessors. The microprocessor 32 also controls the setting of a variable flow/variable orifice valve 36 disposed in the output section 16 of the pump 4. In other words, the valve 36, in response to signals from the microprocessor 32, acts to either increase or decrease the amount of fluid allowed to flow through the valve to conduit 20.

Also disposed in the output section 16 of the pump 4 are a pressure sensor 40 located upstream of the valve 36, a pressure sensor 44 located downstream of the valve, and a temperature sensor 48. The pressure sensors 40 and 44 could be any of a variety of pressure sensors such as a conventional diaphragm strain gauge.

The temperature sensor also can be any of a variety of conventional temperature sensors. The valve 36, pressure sensors 40 and 44, and temperature sensor 48 could be the valve control system described in the aforecited co-pending patent application, Ser. No. 07/533,166, filed Jun. 1, 1990, which is incorporated herein by reference.

Stored in the microprocessor is information relating to the flow rates across the valve 36 which would occur at different pressures at the locations of pressure sensors 40 and 44. Thus, by measuring the pressures at the locations of sensors 40 and 44, the flow rate through the valve 36 can be determined. Also stored in the microprocessor is information relating pump speed to performance and efficiency in terms of output pressure and flow. That is, the different pump speeds, output pressures and flow rates necessary to achieve certain performance and efficiency levels for the system, are stored in the microprocessor.

Although flow rate sensing for the embodiment of FIG. 1 is described as being carried out by the microprocessor 32 from stored information and pressures sensed by sensors 40 and 44, it should be understood that direct sensing of the flow rates could be achieved by installation of a flow rate sensor, for example, downstream of pressure sensor 44. Signals representing the flow rate would then be supplied directly to the microprocessor 32.

Input terminal 60 is coupled to the microprocessor 32 to allow a user or operator to provide input information to the microprocessor such as desired output pressure designations and flow rate designations. The input terminal 60 could be a conventional computer keyboard, panel of switches, or similar electronic input device.

With the above combination, flow and/or pressure of the fluid exiting to the conduit 20 can be selectively controlled.

In operation, a user desiring to independently control the output pressure and flow rate from the pump 4 supplies via the input terminal 60 the desired output pressure and flow rate, whereupon the microprocessor 32 reads the then existing pressures from pressure sensors 40 and 44 to determine the flow rate in accordance with processes described in the aforecited co-pending patent application and, of course, to determine the existing output pressure. The microprocessor 32 then signals the motor 28 to either increase or decrease the speed of the pump 4 depending upon whether it is necessary to increase or decrease the flow rate respectively to reach the desired flow rate. To achieve the desired output pressure, the microprocessor 32 varies the setting of the valve 36 as is necessary to reach the target output pressure. For example, choking down the valve 36 on the fluid flow through the output section 16 would decrease the output pressure on the downstream side of the valve whereas further opening of the valve 36 would increase the downstream pressure. Further, increasing the speed of the motor 28 would cause increased flow of fluid through the output section whereas decreasing motor speed would reduce the output flow. In this manner, both the output pressure and the flow rate can be independently monitored and controlled to achieve the desired values.

Alternatively, if the user desired a certain performance and efficiency level for the system, he could supply via the input terminal 60 indications of the desired level and the microprocessor 32 would read from the memory of the microprocessor the pump speed, output pressure and flow rate necessary to achieve that level and then set the pump speed and valve 36 to achieve the desired level.

FIG. 2 shows a schematic view of another embodiment of the invention which includes the pump, valve, sensors and microprocessor of FIG. 1, but further including a plurality of openings 52 formed in the housing walls 8. These openings function as tap locations and have disposed therein valves 56 and 60 for operating under the control of the microprocessor 32 to selectively open to discharge to the outlet section 16 (when valves 56 are opened) and/or to discharge to the inlet section 12 (when valve 60 is opened). A variety of combinations of tapping valve locations could be used to discharge fluid either to the outlet section of the pump 16 or to the inlet section of the pump 12. As already mentioned, the microprocessor 32 controls the opening of valve 36 and the speed of motor 28 (and thus the pump 4) to affect control of fluid flow and outlet pressure from the pump; with the addition of openings 52, valves 56 and 60 can be selectively opened for specific tuning of the flow producing capability and efficiency of the pump 4. The specific locations, sizes, and number of tapping locations may be determined by the particular pump performance characteristics and the ability to affect pump output pressure and flow by directing fluid from the individual tapping locations to the outlet section 16 or inlet portion 12 of pump 4.

Although valves 56 and 60 were shown as the devices for selectively venting openings 52 in the sidewall 8 of the pump 4, other types of venting control devices could also be utilized such as solenoids, covers which are rotatable into place over the openings and from over the openings, and the like.

FIGS. 3A and 3B respectively show front and side cross-sectional views of a centrifugal pump in which the internal configuration of the pump, namely the impeller, may be selectively varied to thereby control fluid flow production by the pump. The pump of FIGS. 3A and 3B could illustratively be used in the FIG. 1 system, in conjunction with a valve 36 positioned in an output section of the pump, etc. The pump of FIGS. 3A and 3B could illustratively be a Mark III centrifugal pump made by Duriron Company, Inc.

The pump of composite FIG. 3 includes a pump shaft 80 rotatably disposed in a conventional centrifugal pump housing 82. The shaft 80 would be driven, for example, by a variable speed motor such as motor 28 of FIGS. 1 and 2 as previously described. The pump shaft 80 is held in place in the housing 82 by a number of bearings including bearings 84 and 86, and bearing 88 located in bearing carrier 90. The bearing carrier 90, in turn, is generally circular in shape having a control handle 92 extending from one side thereof. The bearing carrier 90 includes a tubular section 94 (FIG. 3B) the outside surface of which is threaded to allow screwing the bearing carrier into a correspondingly threaded opening 96 in the housing 82. After the bearing carrier 90 is screwed into the opening 96 a certain distance, further screwing and unscrewing of the bearing carrier serves to move the pump shaft 80 longitudinally within the housing 82, such that rotational movement of the bearing carrier produces a longitudinal movement in the same direction of both the bearing carrier and the pump shaft. For example, partially unscrewing the bearing carrier 90 would move the pump shaft 80 to the left in FIG. 3B whereas screwing the bearing carrier further into the opening, would move the pump shaft to the right in FIG. 3.

Mounted on one end of the pump shaft 80 is an impeller 98, the impeller being positioned in the intake end of the pump so that when rotated the impeller draws fluid into the pump through inlet opening 100. The fluid drawn in by the impeller 98 is discharged from the pump via an outlet opening 102, in a conventional fashion.

Movement of the pump shaft longitudinally moves the impeller 98 relative to a pump cover plate 104 to thereby vary the pumping dynamics and flow rate of the pump. That is, the position of the impeller relative to the pump cover plate 104 determines the output pressure and flow rate of the pump and thus by selective control of the longitudinal position of the pump shaft 80, the output pressure and flow rate can be controlled.

Rotation of the bearing carrier 90 and thus longitudinal positioning of the pump shaft 80 is carried out under control of a hydraulic control unit 110 (FIG. 3A) which, in turn, is controlled by a control unit such as a microprocessor 32 shown in FIGS. 1 and 2. The hydraulic control unit 110 includes a hydraulic selector 112 which receives hydraulic fluid via an input line 114 and then directs that fluid either to output line 116 or output line 118, as determined by an input signal supplied from a control unit to the hydraulic selector via an electrical conductor 120. The output lines 116 and 118 are coupled into opposite ends of a hydraulic cylinder 122, in which is disposed a hydraulic piston 124. The piston 124 is connected to a piston rod 126 which extends out one end of the cylinder 122 and is coupled to the handle 92 of the bearing carrier 90.

When hydraulic fluid is directed by the hydraulic selector 112 to output line 116, the piston 124 is caused to move to the right to thereby push the handle 92 in the clockwise direction to thus move the pump shaft 80 to the right in FIG. 3B. When the hydraulic selector 112 directs hydraulic fluid to output line 118, the piston 124 is caused to move to the left in FIG. 3A which, in turn, moves handle 92 in the counterclockwise direction to thereby cause movement of the pump shaft 80 toward the left in FIG. 3B. In this manner, the longitudinal positioning of the pump shaft may be controlled by controlling the flow of hydraulic fluid to the cylinder 122.

It is to be understood that the above-described arrangements are only illustrative of the application of the principles of the present invention. Numerous modifications and alternative arrangements may be devised by those skilled in the art without departing from the spirit and scope of the invention and the appended claims are intended to cover such modifications and arrangements. For example, other fluid flow production sources could be provided and controlled as taught, such as steam generator, hydraulic and pneumatic fluid sources, etc.

What is claimed is:

1. A fluid flow production system comprising
   (a) a conduit,
   (b) a variable speed pump for developing flow of a fluid in the conduit, the rate of said flow being variable in response to a control signal,
   (c) means coupled into the flow developing means for selectively varying one or more geometric parameters of the flow developing means in response to a geometry determining signal, capable of independently varying the flow rate and fluid pressure in the conduit,
   (d) flow rate sensing means disposed in the conduit for producing a signal representing the flow rate in the conduit,
   (e) fluid pressure sensing means disposed in the conduit for producing a signal representing the fluid pressure in the conduit, and
   (f) manually settable control means responsive to said flow rate signal and fluid pressure signal for producing a control signal and geometry determining signal for supply to the variable speed pump and geometry varying means respectively to cause development of a desired flow rate and fluid pressure in the conduit.

2. A system as in claim 1 wherein said pump includes a fluid flow producing section from which the fluid flows, and an output section connecting the fluid flow producing section to the conduit to carry the fluid to the conduit, and wherein said geometry varying means is coupled into the fluid flow producing section and the outlet section for selectively varying the flow of fluid in the sections.

3. A system as in claim 2 wherein said geometry varying means includes means for varying the cross-sectional area of the output section through which the fluid flows from the fluid flow producing section to the conduit.

4. A system as in claim 3 wherein said cross-sectional area varying means comprises a continuously variable valve disposed in the output section.

5. A system as in claim 3 wherein said cross-sectional area varying means comprises a continuously variable iris.

6. A system as in claim 2 wherein said fluid flow producing section comprises a housing with walls, coupled to the output section, an input section coupled to the housing for delivering fluid to the housing, and a fluid flow generating means disposed in the housing for causing fluid to flow from the housing through the output section, and wherein said geometry varying means includes
   one or more openings formed in the housing walls,
   conduit means coupling the openings to the output section and/or the input section, and
   means for selectively covering and uncovering the openings to thereby selectively tap the flow of fluid from the housing to the output section and/or input section.

7. A system as in claim 6 wherein said covering means includes means for selectively varying the degree to which the openings are covered.

8. A system as in claim 7 wherein said varying means comprise one or more valves disposed in the openings and selectively operable to cover and uncover the openings.

9. A system as in claim 7 wherein said varying means comprise one or more solenoids disposed to selectively cover and uncover the openings.

10. A system as in claim 2 wherein said fluid flow producing section comprises a housing coupled to the output section, an input section coupled to the housing for delivering fluid to the housing, a pump shaft rotatably disposed in the housing to extend into the input section and longitudinally moveable, an impeller means mounted on the pump shaft in the input section to draw fluid into the input section and force it out through the output section, and wherein said geometry varying means includes means responsive to the geometry determining signal for selectively moving the pump shaft longitudinally to thereby vary the relative position of the impeller means in the input section and thus vary the fluid flow rate and pressure in the output section.

11. A system as in claim 1 wherein said control means comprises a stored program microprocessor.

12. A fluid flow control system comprising
a variable speed pump defining a fluid flow path therethrough and a fluid flow path outlet for operating at a speed determined by an input speed control signal to pump fluid along the fluid flow path and out the outlet at a rate which increases with the increase in speed of the pump and vice-versa, and at a pressure which increases with the increase in speed of the pump and vice-versa,
pressure sensor means for detecting the pressure of fluid at the outlet,
flow rate sensor means for detecting the flow rate of fluid at the outlet,
means coupled to the pump for varying one or more dimensional parameters of the flow path in response to a parameter control signal, to thereby vary the flow rate and pressure of fluid in the flow path, and
control means coupled to the pressure sensor means and flow rate sensor means and responsive to the detected pressures and flow rates for supplying an input speed control signal to the pump and a parameter control signal to the varying means to thereby independently produce a selected flow rate and fluid pressure at the outlet.

13. A fluid flow control system as in claim 12 wherein said varying means comprises means for selectively constricting the flow path.

14. A fluid flow control system as in claim 13 wherein said constricting means comprises a variable orifice valve disposed in the flow path and responsive to the parameter control signal for selectively varying the orifice dimension of the valve.

15. A fluid flow control system as in claim 12 wherein said varying means comprises vent means disposed along the flow path and responsive to the parameter control signal for selectively venting fluid from the flow path.

16. A method of independently controlling the flow rate and output pressure of a variable speed fluid pump having a fluid flow path defined therein, said method comprising
(a) detecting the fluid flow rate of the pump,
(b) detecting the output fluid pressure of the pump,
(c) selectively varying the speed of the pump to thereby change the flow rate and output pressure of the pump, and
(d) selectively varying one or more configurational parameters of the fluid flow path of the pump, in conjunction with step (c), to thereby develop a certain flow rate and output pressure for the pump.

17. A method as in claim 16 wherein step (d) comprises varying the cross-sectional area of the flow path.

18. A method as in claim 16 wherein step (d) comprises selectively venting the flow path at one or more locations therealong.

19. A method as in claim 16 wherein step (d) comprises
(e) impelling fluid, at a certain location in the fluid flow path, to flow therealong, and
(f) selectively varying the location in the fluid flow path at which the fluid is impelled.

* * * * *